(12) United States Patent
Daigger et al.

(10) Patent No.: US 6,517,723 B1
(45) Date of Patent: Feb. 11, 2003

(54) METHOD AND APPARATUS FOR TREATING WASTEWATER USING MEMBRANE FILTERS

(75) Inventors: Glen T. Daigger, Highlands Ranch, CO (US); Albert M. Wollmann, Gainesville, VA (US); Sudhir N. Murthy, Reston, VA (US); Edwin J. Fleischer, Ashburn, VA (US); Thomas A. Broderick, Leesburg, VA (US)

(73) Assignee: CH2M Hill, Inc., Denver, CO (US)

( * ) Notice: Subject to any disclaimer, the term of this patent is extended or adjusted under 35 U.S.C. 154(b) by 0 days.

(21) Appl. No.: 09/626,879

(22) Filed: Jul. 27, 2000

(51) Int. Cl.$^7$ .................................................. C02F 3/00

(52) U.S. Cl. ...................................... 210/605; 210/196

(58) Field of Search .............................. 210/798, 605, 210/196

(56) References Cited

U.S. PATENT DOCUMENTS

| | | | |
|---|---|---|---|
| 4,008,161 A | * | 2/1977 | Wong |
| 4,237,002 A | * | 12/1980 | Strudgeon |
| 4,623,464 A | * | 11/1986 | Ying |
| 4,787,978 A | | 11/1988 | Nicol |
| 4,867,883 A | | 9/1989 | Daigger et al. |
| 4,904,387 A | | 2/1990 | Jordan |
| 4,961,854 A | | 10/1990 | Wittmann et al. |
| 5,258,121 A | | 11/1993 | Jordan |
| 5,342,522 A | | 8/1994 | Marsman et al. |
| 5,354,471 A | | 10/1994 | Timpany et al. |
| 5,364,534 A | | 11/1994 | Anselme et al. |

(List continued on next page.)

FOREIGN PATENT DOCUMENTS

JP    2000-167555    * 6/2000

OTHER PUBLICATIONS

Paper presented at AWWA Annual Conference & Exhibition, Dallas, Texas, Jun. 21–25, 1998, Lebeau et al., "Application of Immersed Membrane Microfiltration for NOM Removal".
Derwent Translation of JP 2000–167555 A (undated).*

Primary Examiner—Chester T. Barry
(74) Attorney, Agent, or Firm—Swanson & Bratschun LLC

(57) ABSTRACT

An apparatus using activated sludge for the removal of biological nutrients from a wastewater includes a bioreactor for containing a mixture of wastewater under treatment and activated sludge. The bioreactor is divided into a plurality of serially connected treatment zones and includes a wastewater inlet, a downstream aerobic zone and an upstream aerobic zone between the wastewater inlet and the downstream aerobic zone. A membrane filter is provided in the downstream aerobic zone so that it functions as an immersed membrane filter with a bioreactor containing an operative volume of wastewater and activated sludge. The immersed membrane filter filters treated water flowing from the bioreactor through a first outlet. An aerator is operative associated with the membrane filter for purging solids from the membrane filter. A second outlet in the downstream aerobic zone is connected to an inlet in the upstream aerobic zone for recycling activated sludge charged with oxygen from the downstream aerobic zone to the upstream aerobic zone.

A method for removal of nutrients from a wastewater includes providing a wastewater to an inlet of a serial, multi-zone, activated sludge bioreactor containing an activated sludge. The bioreactor has a downstream aerobic zone from which water is removed and an upstream aerobic zone between the wastewater inlet and the downstream aerobic zone. Treated water is filtered from the activated sludge in the downstream aerobic zone through an immersed membrane filter. Solids are purged from the immersed membrane filter with an oxygen containing gas and return activated sludge charged with oxygen is recycled from the downstream to the upstream aerobic zone or to an upstream deaeriation zone.

2 Claims, 2 Drawing Sheets

U.S. PATENT DOCUMENTS

| | | |
|---|---|---|
| 5,480,548 A | 1/1996 | Daigger et al. |
| 5,514,278 A * | 5/1996 | Khudenko |
| 5,601,719 A | 2/1997 | Hawkins et al. |
| 5,603,833 A * | 2/1997 | Miller .................. 210/624 |
| 5,650,069 A | 7/1997 | Hong et al. |
| 5,651,889 A * | 7/1997 | Wataya |
| 5,783,083 A | 7/1998 | Henshaw et al. |
| 5,798,044 A | 8/1998 | Strohmeier et al. |
| 5,942,108 A | 8/1999 | Yang |
| 6,007,712 A | 12/1999 | Tanaka et al. |

* cited by examiner

METHOD AND APPARATUS FOR TREATING WASTEWATER USING MEMBRANE FILTERS

TECHNICAL FIELD

The present invention relates to a wastewater treatment process, and more particularly toward an activated sludge treatment process using immersed membrane filters.

BACKGROUND ART

There is an ongoing need for reliable treatment of wastewater both for reuse of the water and in order to meet ever more demanding state and federal discharge quality standards. Of continued concern is the need to remove organic nutrients including phosphates and nitrogen which encourage the growth of water plants and algae which in turn result in degradation of the natural environment and assorted health concerns. The effective and reliable removal of pollutants from wastewaters, particularly carbonaceous materials and nutrients such as nitrogen and phosphorous, has become increasingly important in efforts to supplement and reuse existing municipal water resources. Typical wastewater treatment processes usually include multiple treatment areas that can be broken down into: (1) a preliminary treatment area; (2) a primary treatment area; and (3) a secondary treatment area. The preliminary treatment is concerned with removal of grit and damaging debris, such as cans, bath towels and the like from the untreated wastewater. This is usually a two stage process whereby the debris such as rags and cans are removed by screens and the grit and heavy inorganic solids settle out of the untreated water as is passes through a velocity controlled zone. Dissolved organics and organic nutrients are carried within the fluid stream as it passes from the preliminary treatment area.

A typical primary treatment area, which is an optional element of wastewater treatment, entails a physical process wherein a portion of the organics is removed by flotation and sedimentation. Usually 40–70% of the suspended solids are removed in the primary treatment area.

The secondary treatment area is usually a biological treatment process where bacteria are utilized under controlled conditions to remove nutrients or non-settling suspended solids and soluble organics from the wastewater. These materials would result in an unacceptable biological oxygen demand ("BOD") if left untreated. A typical secondary treatment method is an activated sludge process in which the wastewater is aerated and agitated with an activated sludge then purged of a variety of microorganisms. Often this aerobic stage is combined with an anaerobic stage, i.e., a stage operated in the absence of induced oxygen, either soluble or derived from nitrites or nitrates ($NO_x$), and an anoxic system, i.e., where oxygen is absent but nitrate is present. Phosphorus removal is accomplished in the anaerobic stage and de-nitrification is accomplished in the anoxic stage.

Daigger, U.S. Pat. No. 5,480,548, the disclosure of which is hereby incorporated by reference, discloses in considerable detail anaerobic-anoxic-aerobic secondary treatment processes. Daigger teaches a serial biological reactor consisting of an anaerobic zone, an anoxic zone and an aerobic zone. Daigger further teaches the desirability of an anoxic recycle ("ARCY") of mixed liquor suspended solids ("MLSS") from an anoxic zone to an upstream anaerobic zone. Daigger teaches that effluent from the bioreactor enters a conventional gravity separator from which treated effluent is decanted and return activated sludge is returned to an upstream anoxic zone. In addition to Daigger, Hawkins, U.S. Pat. No. 5,601,719, Marsman, U.S. Pat. No. 5,342,522, Strohmeier, U.S. Pat. No. 5,798,044, Hong, U.S. Pat. No. 5,650,069, Timpany, U.S. Pat. No. 5,354,471, Wittmann, U.S. Pat. No. 4,961,854, Nicol, U.S. Pat. No. 4,787,978 and Yang, U.S. Pat. No. 5,942,108, each disclose multi-zoned bioreactors with some recycling of flow between the various zones to maintain concentrations of useful microorganisms and to improve biological nutrient removal. In each case, however, these patents teach conventional gravity separation by a clarifier or the like, as discussed above with regard to Daigger. One problem with gravity based separation systems is that the solids concentration must be limited in order to effect acceptable levels of gravity clarification. In addition, these systems do not provide a physical barrier to dangerous pathogens such as Giardia and Cryptosporidium. Furthermore, these processes are ineffective for the removal of a wide variety of dissolved organics.

Tanaka, U.S. Pat. No. 6,007,712, teaches a multi-zoned bioreactor wherein the separation of suspended solids occurs at a membrane module. Tanaka provides that non-permeating water which does not pass through the membrane is returned and circulated to a nitrification or aerobic tank. Tanaka also teaches that the membrane of the membrane filter is preferably hydrophilic to make it more difficult for suspended solids to attach and foul the membrane. Tanaka further provides that periodic back washing "by means of an air and a permeated liquid when the suspended solids component is attached" can be performed to purge the solids from the membrane. Tanaka teaches that recycle to the aerobic zone is required because only one seventh ($\frac{1}{7}$) of the water present at the membrane can be filtered, thus requiring that the remaining water be returned upstream. Tanaka is silent whether it would be useful or desirable to recycle water if the membrane module were immersed within a hydrafication (or aerobic treatment) tank. In any event, Tanaka does not teach continuous aeration of the membrane module that would provide an oxygen charged MLSS for recycle to an aerobic zone. Tanaka also fails to provide for suitable removal of shock loads of organisms, such as may result from a toxic spill.

Anselme, U.S. Pat. No. 5,364,534, discloses a process for purifying and filtering water including introducing a pulverulent reagent, such as activated carbon, into a water stream downstream of a gravity separation and upstream of a membrane separation. The pulverulent reagent is recycled from the purge of the membrane separation to upstream of the gravity separation. Anselme does not provide for removal of biological nutrients and BOD and is thus of limited utility in treating municipal wastewater and many other sources of biological nutrient and dissolved organics containing waste water.

The present invention is directed toward overcoming one or more of the problems discussed above.

SUMMARY OF THE INVENTION

A first aspect of the present invention is an apparatus using activated sludge for the removal of biological nutrients from a wastewater. The apparatus includes a bioreactor for containing a mixture of wastewater under treatment and activated sludge. The bioreactor is divided into a plurality of serially connected treatment zones and includes a wastewater inlet, a downstream aerobic zone and an upstream aerobic zone between the wastewater inlet and the downstream aerobic zone. A membrane filter is provided in the downstream aerobic zone so that it functions as an immersed membrane filter with a bioreactor containing an operative volume of wastewater and activated sludge. The immersed membrane filter filters treated water flowing from the bioreactor through a first outlet. An aerator is operatively associated with the membrane filter for purging solids from the membrane filter with air or a gas including a select concentration of oxygen. A second outlet in the downstream aerobic zone is connected to an inlet in the upstream aerobic zone for recycling activated sludge charged with oxygen from the downstream aerobic zone to the upstream aerobic zone.

A second aspect of the invention includes a treatment tank having an inlet and a downstream outlet with the inlet coupled to the first outlet of the bioreactor for receiving treated water. A powdered activated carbon ("PAC") supply provides PAC to the treatment tank near the treatment tank inlet. A membrane filter is operatively associated with the downstream outlet and is situated so that it functions as an immersed membrane filter with the treatment tank containing an operative volume of treated water. A coagulant supply may also be operatively associated with the treatment tank for providing coagulant to the treatment tank near the treatment inlet. The treatment tank preferably includes a plurality of mixing baffles between the inlet and the outlet. A monitor may be provided for monitoring a concentration of dissolved organics in the treated water flowing into the receiving tank inlet. The monitor is operatively associated with the PAC supply to vary the amount of PAC provided to the treatment tank as a function of the concentration of dissolved organics in the treated water.

A third aspect of the present invention is an apparatus utilizing activated sludge for the removal of biological nutrients from a wastewater including a bioreactor having a wastewater inlet and a downstream treated water outlet for containing a mixture of wastewater under treatment and activated sludge and for flowing the mixture along a treatment path between the bioreactor inlet and outlet. A membrane filter is operatively associated with the bioreactor outlet and is situated so that it functions as an immersed membrane filter with the bioreactor containing an operative volume of wastewater and activated sludge. A treatment tank has an inlet coupled to the bioreactor for receiving treated water and a downstream outlet. A PAC supply is operatively associated with the treatment tank for providing PAC to the treatment tank near the treatment tank inlet. A membrane filter is operatively associated with the downstream outlet and is situated so that it functions as an immersed membrane filter with the treatment tank containing an operative volume of treated water.

A fourth aspect of the present invention is a method for the removal of nutrients from a wastewater including providing a wastewater to an inlet of a serial, multi-zone, activated sludge bioreactor containing activated sludge. The bioreactor has a downstream aerobic zone from which treated water is removed and an upstream aerobic zone between the wastewater inlet and the downstream aerobic zone. The method further includes filtering treated water from the activated sludge in the downstream aerobic zone through an immersed membrane filter. Solids are purged from the immersed membrane filter with an oxygen containing gas and return activated sludge charged with oxygen is recycled from the downstream to the upstream aerobic zone. The method may further include feeding treated water from the immersed membrane filter to a treatment tank inlet, adding PAC to the treatment tank near the treatment inlet, flowing the treated water and PAC along a treatment path within the treatment tank and filtering the treated water from the PAC through an immersed membrane filter. The method may also include adding a coagulant or an oxidant to the treatment tank near the treatment tank inlet. A population of microorganisms for metabolizing dissolved organic material may also be maintained in the treatment tank. In a preferred embodiment, the PAC is added on a continuous basis and the concentration of dissolved organic material in the treated water fed into the treatment tank is monitored so that the amount of PAC added to the treatment tank is varied as a function of the concentration of dissolved organic material in the treated water.

The first, second and fourth aspects of the present invention provide for recycle of oxygen charged return activated sludge from an aerobic zone containing the immersed membrane filter to an upstream aerobic zone. This recycle not only re-disburses microorganisms which metabolize dissolved organic materials, but also provides a source of oxygenated return activated sludge to the upstream aerobic zone which decreases the need to provide supplement oxygen to the upstream aerobic zone. This allows the method and apparatus for wastewater treatment to function more efficiently. The use of the immersed membrane filter allows for a higher concentration of MLSS within the bioreactor which allows the volume requirements for the activated sludge process to be reduced. The use of the immersed membrane filter also provides a physical barrier to pathogens such as Giardia and Cryptosporidium which is absent in conventional treatment processes using gravity separators. Those embodiments having a treatment tank charged with PAC receiving the effluent from the bioreactor and including an immersed membrane filter on the tank outlet provide a "multiple barrier" to assure contaminants such as suspended solids, turbidity and pathogens will be adequately removed from the plant effluent. Furthermore, the addition of PAC to the downstream treatment tank provides for greater removal of dissolved organics. The use of PAC in the treatment tank allows for addition of increased concentrations of PAC in the event of a spike of organics introduced into the treatment process, as may result from a toxic spill event. Treatment processes using conventional granular-activated carbon filters do not provide this flexibility. In addition, the porous structure of the PAC provides many sites for microbial growth. Promotion of microorganisms within the treatment tank will provide for oxidation of organics within the treatment tank in addition to absorption by the PAC. These many advantages result from a novel combination of proven treatment apparatus and can be provided economically and dependably.

DETAILED DESCRIPTION OF THE PREFERRED EMBODIMENT

Figure 1:
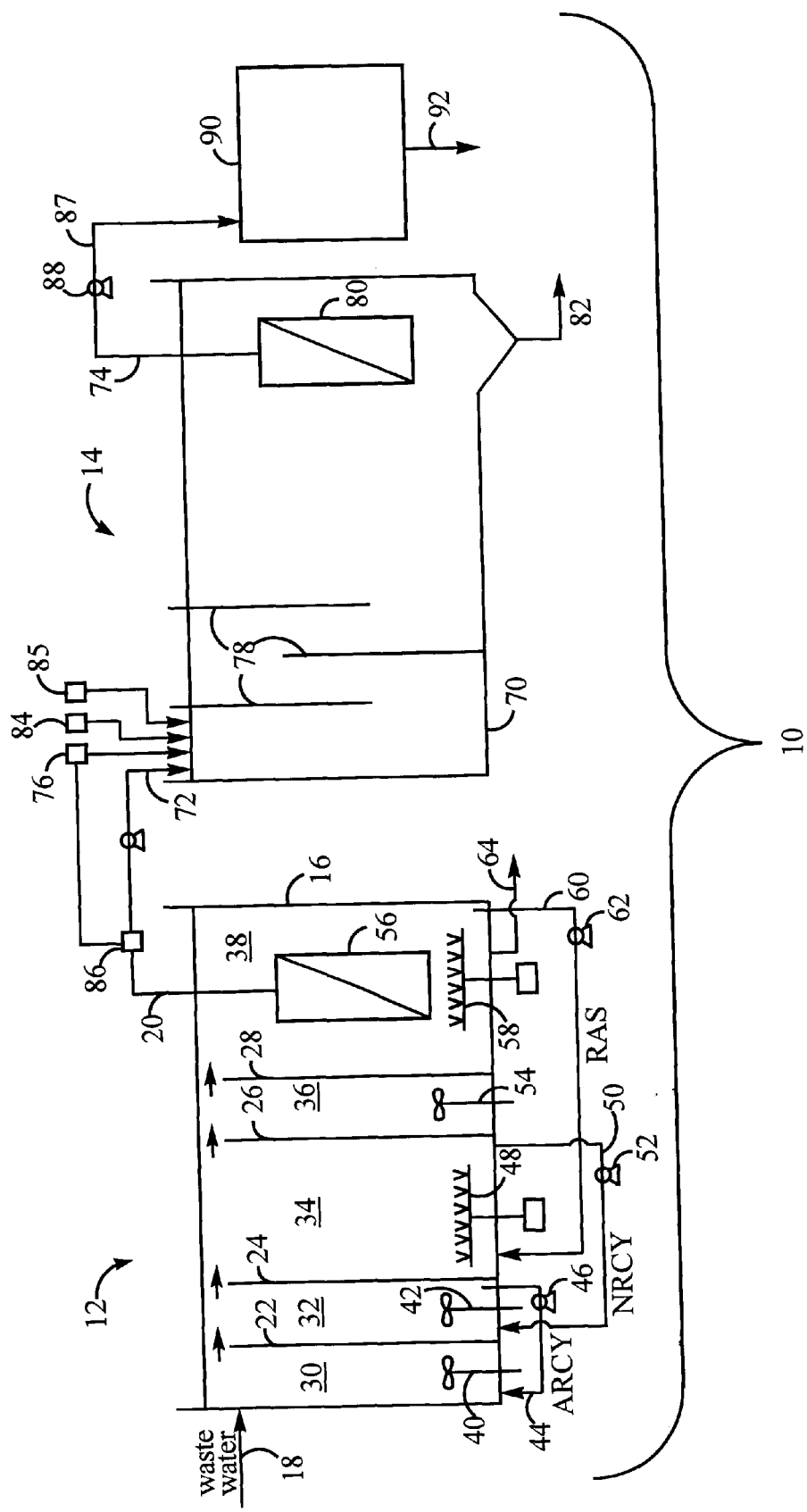
FIG. 1 is a schematic representation of an apparatus for treating wastewater using a membrane filters in accordance with the present invention.

The apparatus for treatment of wastewater using membrane filters 10 consists of two principal components, a membrane filter bioreactor 12 and a powdered activated carbon ("PAC") membrane filter reactor 14. In the preferred embodiment the membrane filter bioreactor 12 and the PAC membrane filter reactor 14 are deployed in series as illustrated in FIG. 1. However, there are applications where the membrane filter bioreactor 12 of the present invention will provide adequate treatment of the wastewater, in which case the membrane filter bioreactor can be utilized without the PAC membrane filter reactor 14.

Figure 2:
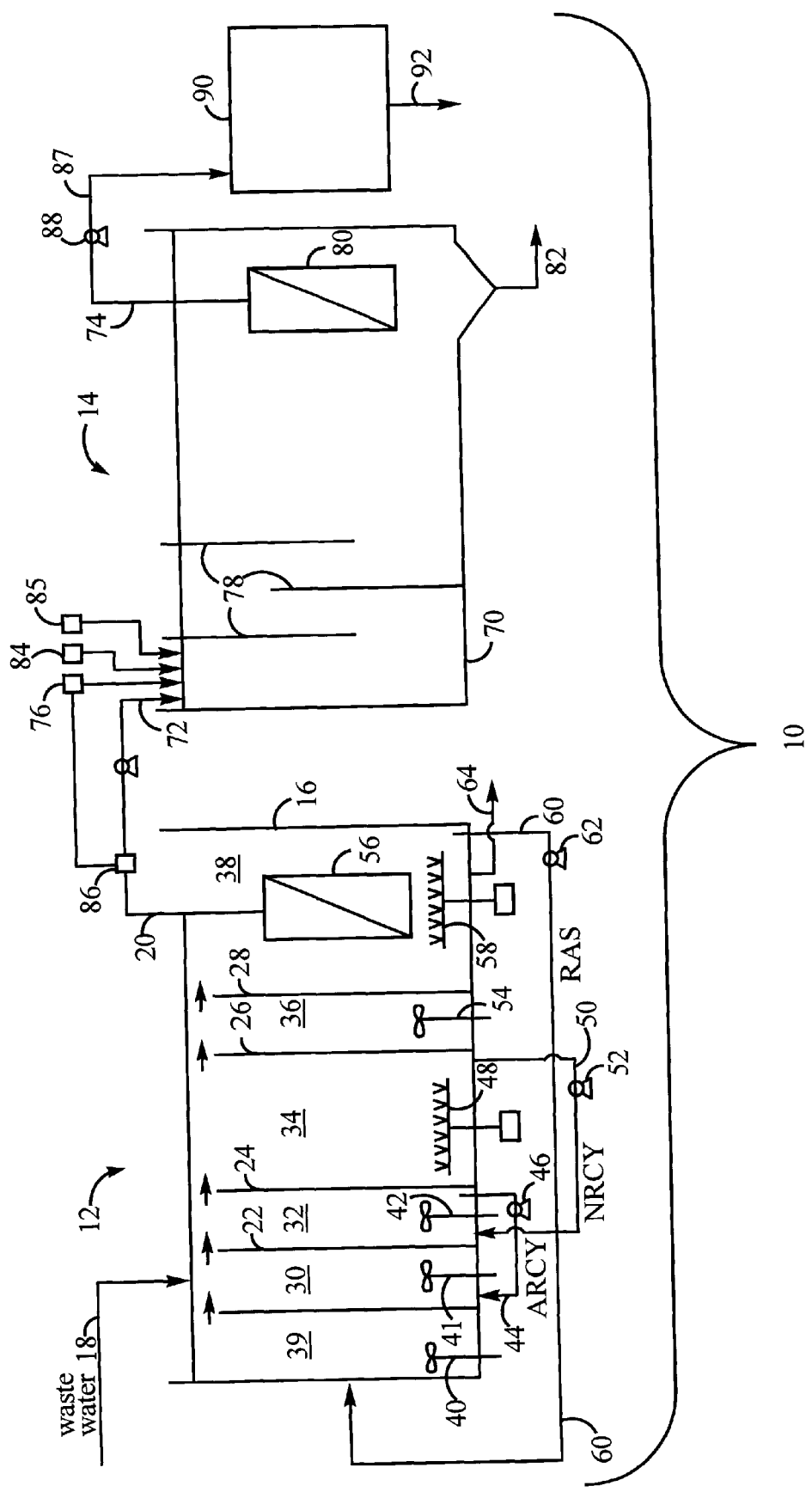
FIG. 2 is a schematic representation of an alternate embodiment of the apparatus of FIG. 1.

The membrane filter bioreactor 12 consists of a bioreactor vessel 16 having a wastewater inlet 18 and a treated water outlet 20. A number of weirs 22, 24, 26, 28 divide the bioreactor vessel 16 into a number of treatment zones. While the preferred embodiment contemplates a single bioreactor vessel 16 divided into treatment zones by the weirs 22, 24, 26, 28, those skilled in the art will appreciate that separate vessels connected by conduits could be employed as an alternative. In the preferred embodiment illustrated in FIG. 1, the zones are in series and include an anaerobic zone 30, a first or upstream anoxic zone 32, a first or upstream aerobic zone 34, a second or downstream anoxic zone 36 and a second or downstream aerobic zone 38. Alternatively, as illustrated in FIG. 2, a deaeration zone 39 including a mixer 40 also can be included at the head end of the reactor 12 to minimize the effects of the recycled aerated MLSS on the influent anaerobic zone. This option will be described further below.

Wastewater is introduced through the wastewater inlet 18 to the anaerobic zone 30 equipped with a suitable mixer 41. In this zone, phosphate uptake is provided whereby microorganisms absorb incoming BOD from the effluent wastewater flow.

The wastewater next flows over the weir 22 into the first anoxic zone 32 which is preferably equipped with a mixer 42 for de-nitrification. De-nitrified mixed liquor (referred to as anoxic recycle or "ARCY") is recycled through line 44 using a pump 46 to the anaerobic zone 30 where it is mixed with fresh effluent wastewater from the inlet 18 to provide the microorganisms for phosphate uptake.

Effluent from the anoxic zone 32 flows over the weir 24 into the first aerobic zone 34. The aerobic zone 34 is provided with suitable aerating equipment such as the diffuser 48 for providing air to the aeration chamber. At the downstream end of the first aerobic zone 34 is a nitrogen rich recycle ("NRCY") which recycles nitrate-nitrogen rich mixed liquid suspended solids through the line 50 using a pump 52 to an upstream portion of the first anoxic zone 32. This mixed liquor is combined with the flow from the anaerobic zone 30 for de-nitrification.

The effluent from the first aerobic zone 34 flows over the weir 26 and into the second anoxic zone 36 provided with a suitable mixer 54 for further de-nitrification.

The effluent from the second anoxic zone 36 flows over the weir 28 and into the second aerobic zone 38. A membrane filter 56 is operatively associated with the outlet 20 in the second aerobic zone 38 to allow for the conveyance of filtered, treated water through the outlet 20 substantially free of any solids from the MLSS. As illustrated schematically in FIG. 1, the membrane filter 56 is situated within the second aerobic zone 38 so that it is immersed therein. The immersed membrane filter 56 has a pore size providing either micro filtration or ultra filtration. Suitable membrane filters are available from Zenon Environmental, Inc. of Ontario, Canada. A representative suitable membrane filter is described in Henshaw, U.S. Pat. No. 5,783,083, which issued to Zenon Environmental, Inc., the disclosure of which is expressly incorporated by reference herein. The membrane is preferably hydrophilic to make it difficult for suspended solids to attach to and clog the membrane. However, to ensure the solids do not clog the membrane and to further provide oxygen to the second aerobic chamber 38, a diffuser 58 is situated below the membrane filter 56 and provides air to the base of the filter 56 to purge the membrane of adhering solids. Return activated sludge which is charged with oxygen as a result of the introduction of oxygen by the diffuser 58 is recycled from near the membrane filter 56 through line 60 by pump 62 to the vicinity of the inlets of the first aerobic zone 34. Because the return activated sludge is charged with oxygen, this reduces the amount of air or oxygen which must be introduced to the first aerobic zone 34 through the diffuser 48. Waste line 64 provides for disposal of waste activated sludge. The waste flow may also be pulled directly from line 60.

As noted above, the effects of aerated MLSS recycle can be diminished through the installation of a deaeration zone 39 at the head end of the reactor as illustrated in FIG. 2. In this embodiment, the return activated sludge 60 is recycled by pump 62 to the deaeration zone 39, instead of the aerated zone 34. After a suitable holding period to reduce the oxygen concentration of the MLSS, it would flow into the anaerobic zone 30 and would mix with the raw wastewater flow 18.

As used herein, the term "anaerobic" is defined as the state existing within a wastewater treatment zone which is substantially free of nitrates and nitrites ($NO_x$). The term "anoxic" means the condition existing within a wastewater treatment zone wherein BOD is metabolized by nitrates and/or nitrites. An "aerobic" zone may contain oxygen in amounts up to about 2.0 mg/L or greater depending on the amount of oxygen deliberately introduced into the wastewater through the diffusers. While the diffusers are referred to as introducing air to the chambers, oxygen in various concentrations mixed with otherwise inert gases (collectively, an "oxygen containing gas") may be preferred. The wastewater introduced through the inlet 18 typically contains little or no $NO_x$ due to the reducing power of BOD in the presence of microorganisms in the wastewater. The NRCY from the first aerobic zone 34 is thus important for providing $NO_x$.

The anaerobic zone 30 may be of any suitable size. Desorption of substantial quantities of BOD from the effluent wastewater can occur in relatively short periods of time, and the anaerobic treatment can be conducted for periods from approximately 10 minutes to approximately four hours, depending upon the nature of the waste water influent.

The anoxic zones 32, 36 function as de-nitrification zones wherein nitrate/nitrite/nitrogen in the effluent is converted to elemental nitrogen. There is substantially no dissolved oxygen present in the anoxic zone. The period of wastewater treatment within the anoxic zone can range from about 20 to about 90 minutes. The conversion of the $NO_x$ to elemental nitrogen occurs because the microorganisms in the anoxic zone seek oxygen though the reduction of $NO_x$ compounds to nitrogen gas. The nitrogen gas is then able to escape the liquid phase to the atmosphere.

In the aerobic zone, oxygen promotes oxidation of ammonia present in the wastewater by the microorganisms. The ammonia nitrogen is thus converted to $NO_x$. The period of time wastewater is subjected to aerobic treatment can vary depending upon the operating conditions, but generally the period is between approximately 2–10 hours.

It will be appreciated by those skilled in the art that the anaerobic-anoxic-aerobic zone sequences of the preferred embodiment may be varied depending upon the requirements of an input wastewater.

The PAC membrane filter reactor 14 consists of a treatment vessel or tank 70 having a treated water inlet 72 and a downstream outlet 74. PAC is introduced near the treated water inlet 72 from a PAC supply 76. A plurality of baffles 78 between the treated water inlet 72 and the outlet 74 agitate the combination of treated water and PAC to ensure adequate mixing and to promote absorption of dissolved organics by the PAC from the treated water. Alternatively, other mechanisms (i.e., mixers) can also be used for this purpose in place of the baffles. A membrane filter 80 is attached to the outlet 74 to filter PAC and other suspended solids from the effluent. The membrane filter 80 is situated within the treatment tank 80 so that it is immersed within the treated water/PAC mixture. Waste PAC is periodically or on a continual basis withdrawn from the treatment tank through the waste PAC outlet 82 so that a supply of fresh PAC can be added from PAC supply 76.

Certain treated waters may require the addition of a coagulant to aid in the removal of suspended solids, phosphorous or other substances. Therefore, the preferred embodiment includes a coagulant supply 84 for providing coagulant to the treatment tank in the vicinity of the treated water inlet 72. In addition, some treated waters may require the addition of an oxidant to the treated water flow to facilitate oxidation of organic materials to promote assimilation of the organic materials by microorganisms in the reactor. Thus, an oxidant supply 85 may provide an oxidant near the treated water inlet 72.

Because a high concentration of solids can be allowed to build within the treatment tank, the concentration of PAC within the reactor can be maintained in the range of 10–15,000 mg/L. As a result, the solids retention time of the treatment tank can be controlled, allowing a population of microorganisms to build up within the treatment tank. The porous structure of the PAC will provide many sites for microbial growth. These microorganisms will metabolize dissolved organic material in the flow stream and compliment the absorption of organics by the PAC.

Because PAC can be added on demand from the PAC supply 76, in the event of a spike in the dissolved organics content, which may result from a toxic spill, the feed of PAC can be increased quickly to remove organic material from the flow stream by absorption. A monitor 86 is preferably provided between the treated water outlet 20 from the bioreactor vessel 16 and the treated water inlet 72 to the treatment tank 70 to monitor the amount of dissolved organics in the treated water. The monitor 86 is coupled to the PAC supply 84 to vary the PAC supplied to the treatment tank as a function of the concentration of dissolved organics in the treated water.

Effluent from the treatment tank outlet 74 is pumped through line 87 using pump 88 and may be suitable for discharge in the environment or reuse, or as illustrated in FIG. 1, may be subjected to disinfection at the disinfection system 90 before discharge at 92.

The apparatus for treating wastewater using membrane filters of the present invention has numerous advantages over prior art wastewater treatment apparatus and methods. The use of the membrane filter bioreactor allows for higher concentrations of mixed liquor suspended solids, thereby reducing the volume requirements of the reactor vessel. The membrane filter provides for removal of Giardia, Cryptosporidium and other pathogens. Recycle of the aerated mixed liquor suspended solids from the downstream aerobic zone to the upstream aerobic zone decreases the amount of supplemental aeration that must be provided to the upstream aerobic zone 34, therefore lowering operating costs. The use of the PAC membrane filter reactor 14 in series with the membrane bioreactor 16 provides still further advantages. The use of two membrane filters facilitates selection of superior quality effluent with increased reliability. The "multiple barriers" provided by the two membrane filters used in series provides greater assurance of adequate treatment where the effluent quality must be assured for indirect water reuse applications or for discharges to sensitive receiving waters. Use of the two membrane filters provides superior protection against pathogens remaining in the plant effluent. The PAC membrane filter reactor provides enhanced removal of residual and dissolved organic compounds which might pass through the upstream membrane filter bioreactor. The use of PAC in the PAC membrane filter reactor allows for rapid increase in the PAC concentration to facilitate greater absorption of organics, as may be required in a toxic spill event. The need for increased PAC can be continuously monitored and automatically adjusted. These many advantages are achieved by combining known and proven technologies in a unique and economical manner.

What is claimed is:

1. A method for removal of biological nutrients from a wastewater, comprising:

providing a serial multistage bioreactor containing activated sludge having in hydraulic series an anaerobic zone, an upstream anoxic zone, an upstream aerobic zone, a downstream anoxic zone and a downstream aerobic zone, each zone having an upstream inlet and a downstream outlet;

providing wastewater to the anaerobic zone inlet;

filtering treated water from the activated sludge in the downstream aerobic zone through an immersed membrane filter;

purging solids from the immersed membrane filter with an oxygen containing purge gas;

recycling return activated sludge charged with oxygen associated with the oxygen containing purge gas from the downstream aerobic zone to near the inlet of the upstream aerobic zone;

recycling a nitrogen rich recycle from near the upstream aerobic zone outlet to near the upstream anoxic zone inlet; and recycling a de-nitrified mixed liquor from near the upstream anoxic zone outlet to near the anaerobic zone inlet.

2. An apparatus utilizing activated sludge for the removal of biological nutrients from a wastewater, comprising:

a bioreactor for containing a mixture of wastewater under treatment and activated sludge, the bioreactor being divided into a plurality of hydraulically serially connected treatment zones including an anaerobic zone, an upstream anoxic zone, an upstream aerobic zone, a downstream anoxic zone and a downstream aerobic zone, the bioreactor being configured to flow wastewater from a downstream outlet of an upstream zone to an upstream inlet of a downstream zone;

a membrane filter in the downstream aerobic zone, the membrane filter being situated in the downstream aerobic zone so that it functions as an immersed membrane filter with the bioreactor containing an operative volume of wastewater and activated sludge, the immersed membrane filter filtering treated water flowing from the bioreactor through a first outlet;

an aerator operatively associated with the membrane filter for purging solids from the membrane filter with an oxygen containing purge gas;

a first recycle conduit in liquid communication between the downstream aerobic zone and near the inlet to the upstream aerobic zone for recycling return actuated sludge charged with oxygen associated with the oxygen containing purge gas from the downstream aerobic zone to the upstream aerobic zone;

a second recycle conduit in liquid communication between near the upstream aerobic zone outlet and near the upstream anoxic zone inlet for recycling a nitrogen rich recycle to the upstream anoxic zone; and a third recycle conduit in fluid communication between near the upstream anoxic zone outlet and near the anaerobic zone inlet for recycling a de-nitrified mixed liquor to the anaerobic zone.

* * * * *